United States Patent [19]

Nestler et al.

[11] Patent Number: 5,215,213
[45] Date of Patent: Jun. 1, 1993

[54] ITEM STORAGE AND DISPENSING APPARATUS

[75] Inventors: Richard F. Nestler, Pittsburgh, Pa.; Theodore K. Milbaugh, Wadsworth; Kurt M. Olsen, Wooster; Jerry Christensen, Shreve, all of Ohio

[73] Assignee: Richard F. Nestler & Associates, Inc., Pittsburgh, Pa.

[21] Appl. No.: 453,307

[22] Filed: Dec. 21, 1989

Related U.S. Application Data

[63] Continuation of Ser. No. 370,019, Jun. 22, 1989, abandoned.

[51] Int. Cl.$^5$ .................................................. B65G 47/10
[52] U.S. Cl. ................................. 221/129; 186/55; 221/131
[58] Field of Search ............... 186/55, 56; 198/362, 198/366, 728; 414/269, 271; 221/12, 129, 131, 195, 196, 247, 252

[56] References Cited

U.S. PATENT DOCUMENTS

| | | |
|---|---|---|
| 468,827 | 2/1982 | Prior . |
| 591,215 | 10/1897 | Ganon ................................. 221/197 |
| 806,001 | 11/1905 | Roberts . |
| 921,941 | 5/1909 | Ballard . |
| 1,005,382 | 10/1911 | Webster . |
| 1,347,558 | 7/1920 | Simon . |
| 1,482,071 | 1/1924 | Duff et al. . |
| 1,619,294 | 3/1927 | Cutler . |
| 1,946,078 | 2/1934 | Kelley ................................. 312/97 |
| 1,981,783 | 11/1934 | Debussey . |
| 2,239,196 | 4/1941 | Lunvik ................................. 312/63 |
| 2,276,293 | 3/1942 | Farmer ................................. 234/1.5 |
| 2,348,400 | 5/1944 | Manspeaker . |
| 2,661,991 | 12/1953 | Petrecca ............................... 312/70 |
| 2,689,062 | 9/1954 | Brown ................................. 221/197 |
| 2,700,479 | 1/1955 | Carlson et al. ................. 414/271 X |
| 2,717,086 | 9/1955 | Bush . |
| 2,834,510 | 5/1958 | Cenotti ................................. 221/79 |
| 3,058,545 | 10/1962 | Morehouse . |
| 3,064,856 | 11/1962 | Council ................................. 221/13 |
| 3,074,593 | 1/1963 | Krakauer et al. ...................... 221/13 |
| 3,104,737 | 9/1963 | Fork ...................................... 189/36 |
| 3,166,214 | 1/1965 | Stevens et al. ......................... 221/4 |
| 3,217,925 | 11/1965 | Thomas ................................. 221/7 |
| 3,247,929 | 4/1966 | Langley . |
| 3,313,449 | 4/1967 | Parks .................................... 221/6 |
| 3,342,351 | 9/1967 | Sinjavsky et al. .............. 414/271 X |
| 3,456,817 | 7/1969 | Irazoqui . |
| 3,498,498 | 3/1970 | Craven, Jr. et al. ................. 221/129 |
| 3,541,309 | 11/1970 | Cutter ................................. 235/61.7 |
| 3,542,245 | 11/1970 | Braginetz ........................... 221/232 |
| 3,624,792 | 11/1971 | Lipfert ............................... 221/129 |
| 3,648,241 | 3/1972 | Naito et al. ..................... 340/147 R |
| 3,819,087 | 6/1974 | Schuller et al. ...................... 221/123 |
| 3,901,366 | 8/1975 | Schuller et al. . |
| 3,902,633 | 9/1975 | Spengler ............................... 221/7 |
| 3,908,800 | 9/1975 | Drapeau . |
| 3,920,100 | 11/1975 | Dunphy .............................. 186/1 A |
| 3,931,452 | 1/1976 | Nilsson ................................. 174/48 |
| 3,964,619 | 6/1976 | Irmler . |
| 3,991,907 | 11/1976 | Kull ..................................... 221/84 |
| 4,000,821 | 1/1977 | Naito et al. . |
| 4,061,245 | 12/1977 | Lotspeich ............................. 221/75 |
| 4,069,943 | 1/1978 | Fawcett ................................. 221/5 |
| 4,423,827 | 1/1984 | Guigan ........................... 221/131 X |
| 4,494,675 | 1/1985 | Stutsman ......................... 221/129 X |
| 4,542,808 | 9/1985 | Lloyd, Jr. et al. ................... 186/56 |
| 4,561,546 | 12/1985 | Maroney ......................... 198/728 X |
| 4,645,036 | 2/1987 | Nestler ................................. 186/55 |
| 4,690,302 | 9/1987 | Zebley et al. ......................... 221/11 |
| 4,690,303 | 9/1987 | Draper et al. ...................... 221/131 |

FOREIGN PATENT DOCUMENTS

| | | |
|---|---|---|
| 865466 | of 1941 | France ................................. 221/129 |
| 06916 | 11/1987 | PCT Int'l Appl. . |
| 1585798 | 3/1981 | United Kingdom . |

Primary Examiner—F. J. Bartuska
Attorney, Agent, or Firm—Andrew J. Cornelius

[57] ABSTRACT

Apparatus for disengaging items from storage compartments and distributing them to the proper delivery locations. An associated system serves to control the storage and dispensing apparatus and, additionally, provides data relative to the operation of the device.

14 Claims, 13 Drawing Sheets

ITEM STORAGE AND DISPENSING APPARATUS

This is a continuation of copending application Ser. No. 07/370,019 filed on Jun. 22, 1989 now abandoned.

BACKGROUND OF INVENTION

Field of the Invention

The invention relates to mechanical storage and dispensing apparatus and, more specifically, it relates to an improved storage and dispensing apparatus which markedly reduces the risk of loss due to theft when the apparatus is used, for example, as a product dispenser.

Background Information

An analysis of the retail industry demonstrates the inventorying and merchandising of many high-volume, low-profit, high-pilferage items. A deeper analysis of the retail industry indicates that net profits in supermarkets average about one cent per dollar as a national average. In smaller convenience stores, national averages of net profits are approximately 3.5 cents per dollar. In this very highly competitive field, innovations are made infrequently, even though frequent innovation is badly needed. Accordingly, one of the main concerns of the retailer is the need to reduce or eliminate problems which reduce the profit realized by the retailer.

Such problems include product theft, effective utilization of floor space, unnecessarily high levels of inventory and the maintenance of a profitable level of labor and other types of overhead. At the same time, the retailer must provide competitive pricing in this highly competitive business, properly service his or her customers and realize a profit level sufficiently high to maintain the retailer in business.

Generally, products which are offered for sale to the consuming public are physically located in areas where consumers shop. The products are made visible to the consumers to create a desire in the consumer to purchase the product. Supplies of the products are maintained in the stores which are adequate to satisfy the conceived demand for the product by consumers. This encourages sales by permitting the consumers to leave the store with the product they purchased rather than requiring the consumers to purchase the product for later delivery. However, such accessibility of relatively large supplies of products encourages some consumers to steal products, especially small easily concealable products, rather than to purchase them. Obviously, each theft of a product reduces the income of the store owner.

The store owner's loss from theft is aggravated where the types of products stolen are those which are sold in high volume by the store owner and which generate a small profit for each sale. For example, for each package of cigarettes stolen from a store owner, it is necessary for the store owner to sell approximately 80 additional packages of cigarettes to recover the store owner's cost of the stolen pack. Product theft is paid for from net profits, normally one cent on the dollar in supermarkets. Further, because of the high demand for cigarettes and the ease with which a pack of cigarettes can be concealed by the consumer, the theft of cigarettes in great quantities is widespread. Because the profit realized by a store owner from the sale of a single pack of cigarettes is low, theft of cigarettes presents a major problem to store owners. Eliminating cigarette pilferage can add as much as 20% to a supermarket's net profit, and 40% to a convenience store's net profit.

Another major problem facing retail store owners is maintenance of an inventory of products that is sufficiently high to meet the demand of the consuming public, but that is not so high that an excessively great amount of money is represented by the inventory on a continual basis. Although many types of inventory control systems and apparatus have been devised, they are usually complicated and expensive and are used to regulate the inventory of only large retailers. Smaller retailers generally cannot justify the cost of such a system to control the inventory of all their products. However, small retailers may have problems maintaining an adequate inventory of selected types of products and, accordingly, could profit from an inventory control system that can be applied on a product-by-product basis.

Further, the manner in which most large retail stores, such as supermarkets, receive new products and convey them to areas of the store for purchase by consumers creates a problem for the store owner. In particular, products are received by the supermarket and stored in a stock room until needed on the shelves. Theoretically, as the products are needed on the shelves stock personnel transfer the products from the storerooms to the shelves. However, any delay in making the transfer results in an out-of-stock condition in the store and lost sales. The problem is aggravated when the product involved represents a high volume of sales over a short period of time requiring frequent transfer of the product from the storeroom to the shelves.

With respect to the sale of cigarettes by supermarkets the problem is further aggravated by the fact that checkout clerks are generally responsible for making the transfer of cigarettes from the stockrooms to shelves which are generally located at the checkout counters, in an attempt to reduce theft of cigarettes by consumers. Often, the checkout clerk is asked for a brand of cigarettes that is not available at the checkout counter but which is available in sufficient supply in the stock room. Because the checkout clerk is usually under a great deal of time pressure, and because the clerk would be required to leave the checkout area unattended, the clerk typically is not willing to travel to the stockroom to satisfy the consumer's demand for the product. Instead, the consumer is usually told that the store has no cigarettes of the brand demanded. Accordingly, sales of cigarettes are often lost by supermarkets. As with eliminating pilferage, eliminating out of stock conditions can add as much as 20% to a supermarket's net profit and 40% to a convenience store's net profit.

An additional problem exists with respect to products which are ingested. Products which are shelved at locations which are accessible to consumers risk tampering. Recently, tampering of medications and food products has led to the development of tamper resistent packaging to reduce such risks. But despite such efforts, the risk of tampering has not been eliminated. The present invention limits the accessibility of the products to authorized personnel only, thereby substantially reducing the opportunity for tampering to occur.

Another major feature of the present invention is its effective apparatus for displaying advertising. The periphery of the dispenser's shell is adapted to display advertising which is, preferably, constructed of translucent material so that it may be illuminated from either behind or in front. As 64.9% of retail purchase decisions are made after a consumer has entered the store, this convenient mode of advertising helps to promote sales and, thus, increase the store's profitability.

U.S. Pat. No. 806,001 discloses a package delivering apparatus for stores. This device is not designed to store product above a store checkout area.

U.S. Pat. No. 921,941 discloses a dispensing grocery cabinet for items which are typically stored in hoppers and sold by volume or weight rather than on a unit-by-unit basis.

U.S. Pat. No. 2,239,196 discloses a vending and display device which includes a plurality of vertical compartments for the storage of products. This apparatus is designed to manually discharge individual items from the compartments directly to the person activating the discharge mechanism.

U.S. Pat. No. 2,276,293 discloses an article order assembly system. This system stores and dispenses products from an overhead storage position to a delivery or assembly station below.

U.S. Pat. No. 3,058,545 discloses an automated device for directing previously dispensed items to an automatic bagging machine and then, ultimately, to the location of the purchaser. The patent describes, in general, various different types of dispensing units and indicates that any one of a variety of such dispensing units may be incorporated into the claimed dispensing mechanism.

U.S. Pat. No. 3,313,449 discloses adjustable warehouse storage bins with an ejector mechanism. This device suffers from the drawback that a separate ejector motor is required for each bin location.

U.S. Pat. No. 3,648,241 discloses a stationary stack assembly with remote controlled access. This patent is directed, primarily, to a manual product distribution system and not to an automatic dispensing system.

U.S. Pat. No. 3,908,800 discloses an item selecting system which, similarly, is designed for aiding manual selection of items from storage compartments and not for the automatic dispensing and distribution of items.

U.S. Pat. No. 4,645,036 and its Divisional application Ser. No. 07/017,190 disclose a product dispenser which limits access of stored products to unauthorized personnel. That device incorporates a plurality of storage compartments for maintaining the inventory level of the items and a conveyor belt which distributes dispensed products to a desired location.

Despite these devices, there exists a real need for a product dispenser which automatically dispenses one or more individual items to any one of a plurality of locations from an overhead storage location.

SUMMARY OF THE INVENTION

The present invention has met the above-described need. With this device, an apparatus for dispensing items is provided which includes an item dispensing chamber which is supported by a frame and which supports the items prior to distribution. A first pusher, which is attached in a moveable manner to the frame, is used for disengaging an item from the dispensing chamber and onto a moveable door. A moveable second pusher, which is attached to the frame, moves the item relative to the door, and a discharge apparatus, which is attached to the frame, receives the item which was disengaged from the dispensing chamber.

BRIEF DESCRIPTION OF THE DRAWINGS

The invention may be better understood, and further advantages and uses thereof are readily apparent, when considered in view of the following detailed description of exemplary embodiments, taken with the accompanying drawings in which.

DETAILED DESCRIPTION OF THE PREFERRED EMBODIMENTS

FIGS. 1 through 16 show the preferred embodiment of the present invention. Although the preferred embodiment can be mounted in any one of a number of different ways, it is shown mounted to the ceiling of a supermarket in the general area of the checkout counter. As shown, the dispenser is particularly useful for discouraging theft of the products stored within the dispenser, while providing easy access to the products by the checkout clerks, for making available to the supermarket owner valuable floor space and for effectively transferring the supermarket's inventory to the checkout counter.

Figure 1:
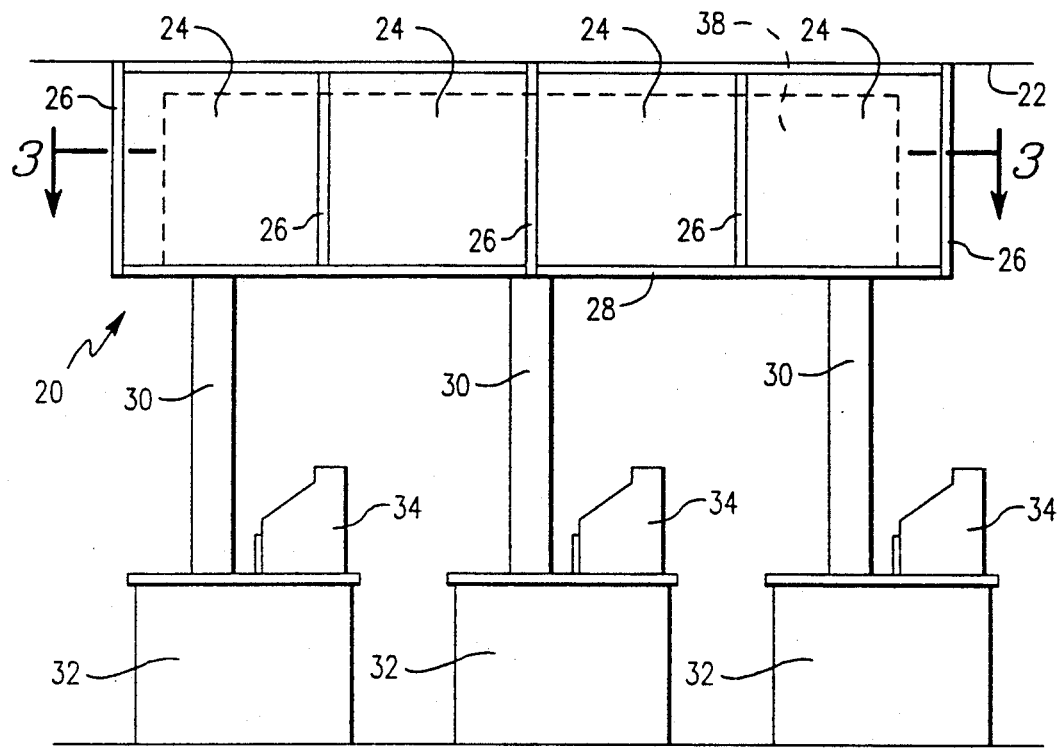
FIG. 1 is a side elevational view of the present invention and a store checkout area.

FIG. 1 shows dispenser 20 which is mounted to ceiling 22 of the retail store. Chutes 30 receive products from compartment unit 38 and deliver products to the clerks stationed at checkout counters 32. Consoles 34 are used by the checkout clerks to cause dispenser 20 to eject a product from a particular compartment of compartment unit 38.

Figure 2A:
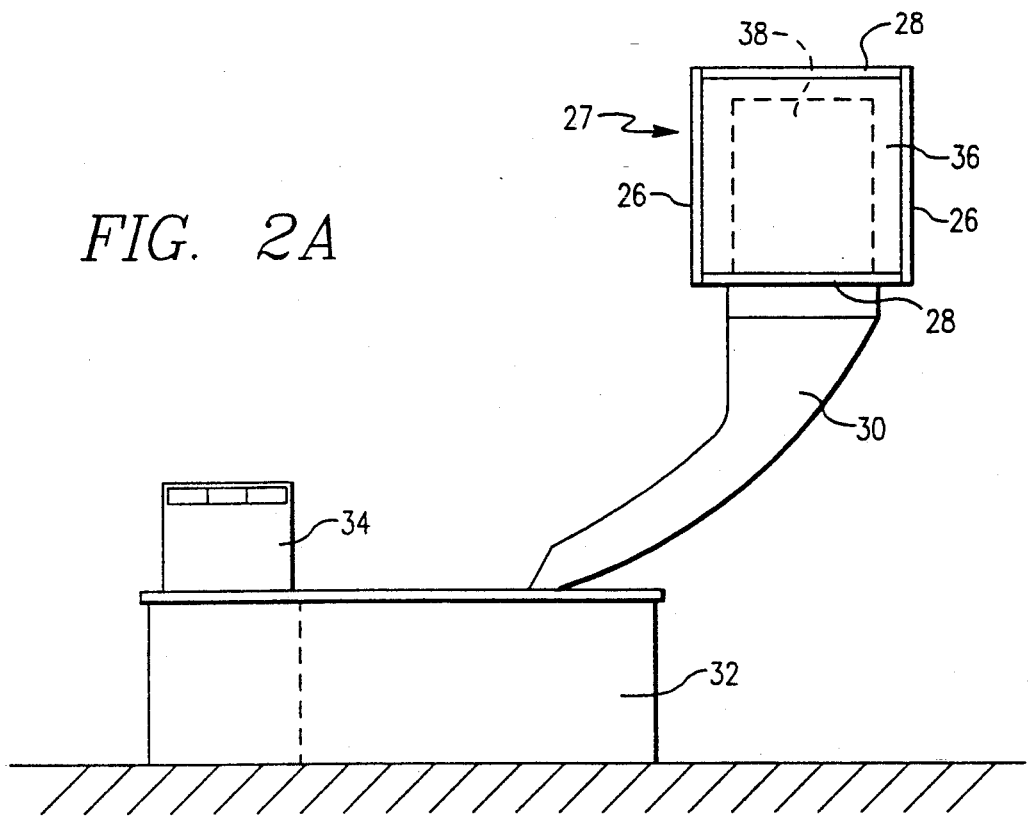
FIG. 2A is a rear elevational view of the product dispenser and a store checkout station.
Figure 2B:
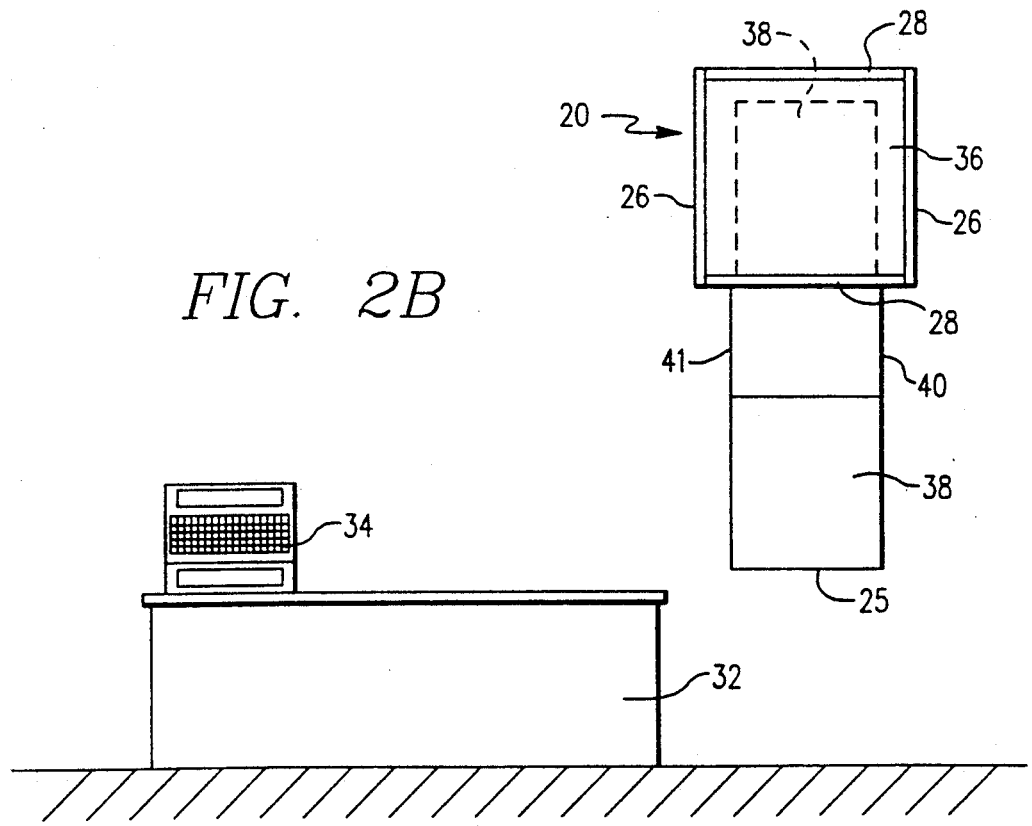
FIG. 2B is a front elevational view of the product dispenser in its extended position and a store checkout counter.

FIG. 2A shows compartment unit 38 in its retracted position and FIG. 2B shows compartment unit 38 in its extended position. Compartment unit 38 is guided for movement between its extended and retracted positions by guide cables 40 and 41 (one of each shown).

In the retracted position shown in FIG. 2A direct access to the products held by compartment unit 38 is severely restricted, thus discouraging theft. By moving compartment unit 38 to the extended position shown in FIG. 2B, a store clerk can readily load products into or remove products from the compartments in compartment unit 38.

FIGS. 1 through 2B also show side panels 24, end panels 36 and bottom panel 25 which define the shell of dispenser 20. Vertical rails 26 and horizontal rails 28 support panels 24 and 25, respectively. Printed material, such as product advertisements, can be secured against panels 24 and 25 by horizontal rails 28 and vertical rails 26.

Figure 3:
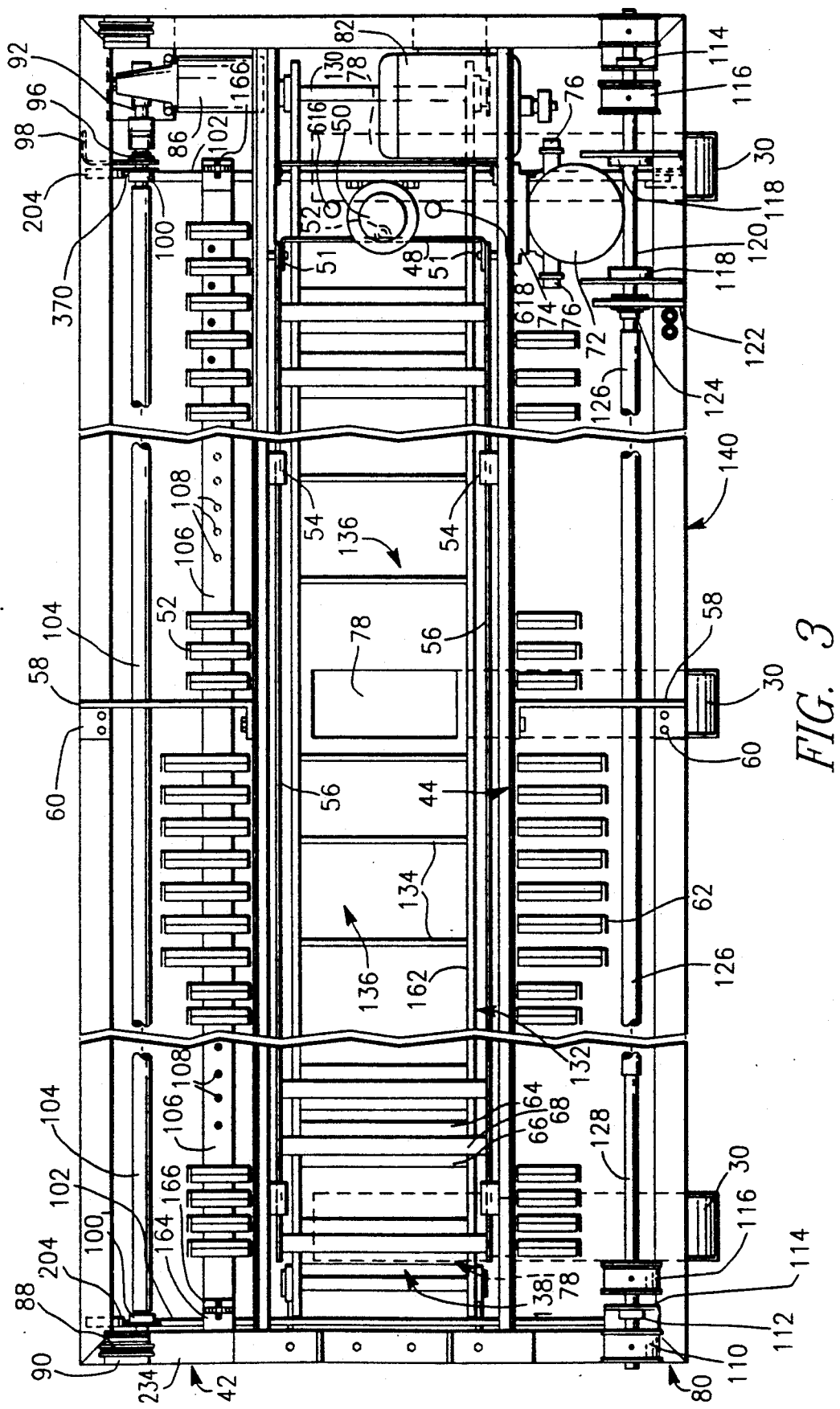
FIG. 3 is a top view of the interior of the product dispenser.
Figure 4:
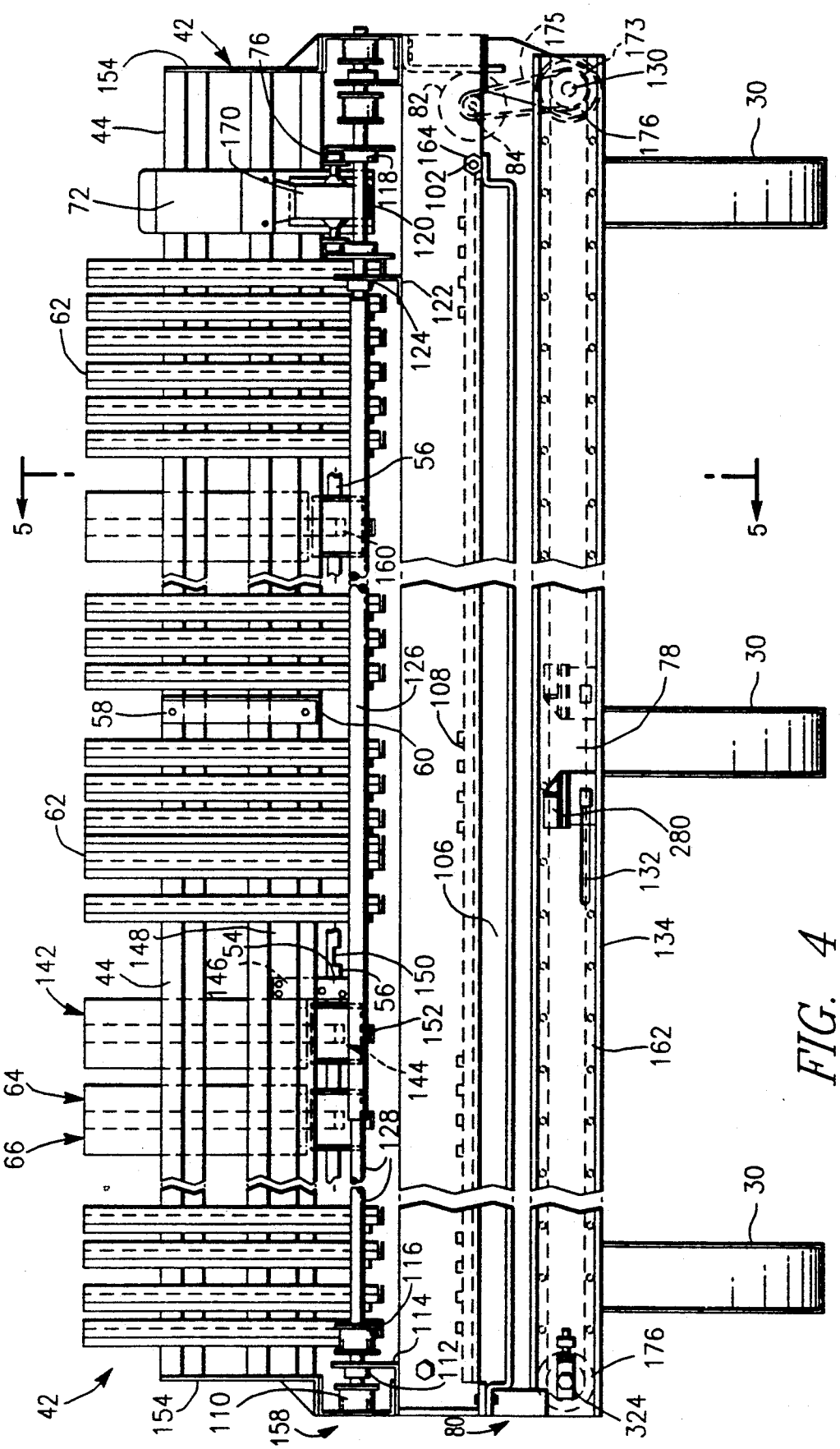
FIG. 4 is a side elevational view of the interior of the product dispenser.
Figure 5:
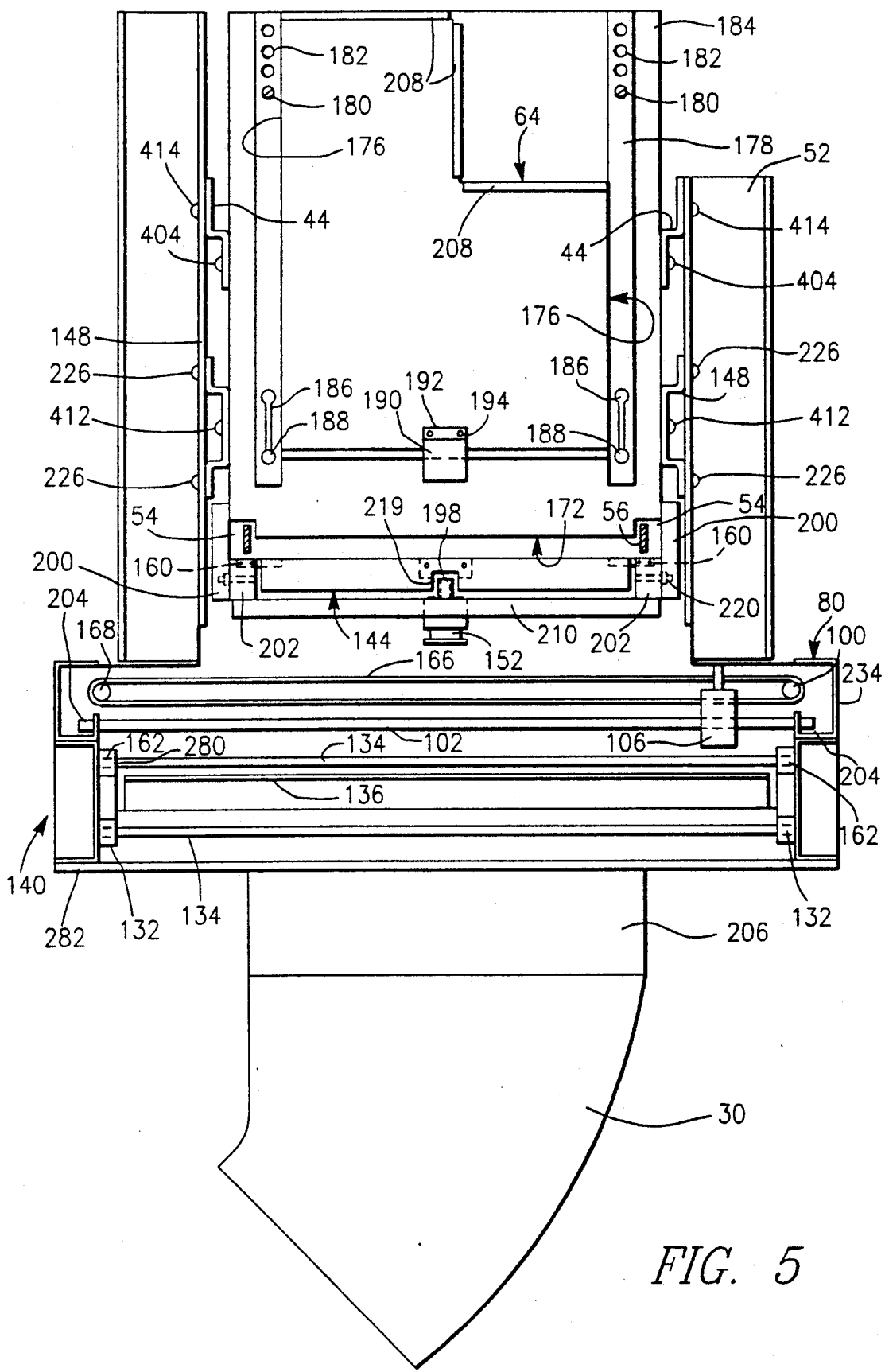
FIG. 5 is a front elevational view of a portion of the interior of the product dispenser.

FIGS. 3 and 4 show compartment unit 38. Compartment unit 38 includes center assembly 42, base assembly 80 and conveyor assembly 140. Center assembly 42 consists of pack dividers 62 and carton compartments 64 and 66 which contain products that are delivered to the checkout clerk by dropping through opening 78 and into chute 30.

Carton compartment assembly 142 comprises carton compartments 64 and 66. Carton retainer assembly 144 comprises the discharge mechanism for products stored in compartments 64 and 66. Carton compartment assembly 142 is securely mounted to rails 44 and 148 by fasteners 404 and 412, respectively. Pack dividers 62 are also removably mounted to rails 44 and 148 by fasteners 414 and 226, respectively, in a manner well known in the art (see FIG. 5). That mounting arrangement allows the interior space within pack dividers 62 to be adjusted to accommodate various sizes of cigarette packs. Side panels 154 further support rails 44 and 148 to center assembly base 158.

Figure 15:
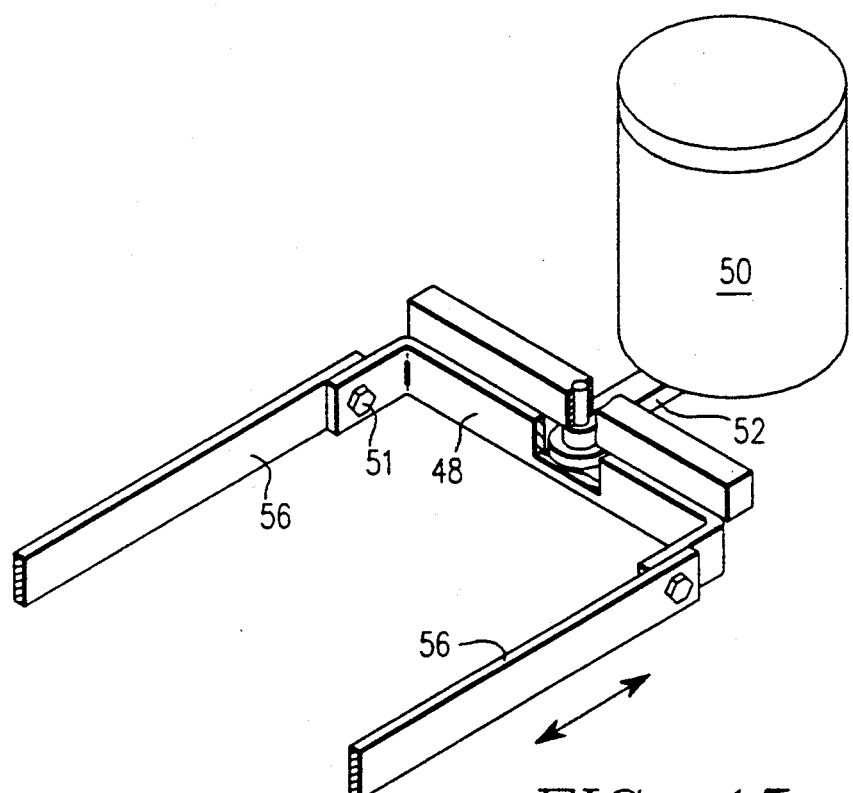
FIG. 15 is a perspective view of the shuttle bar and an associated motor mechanism of the present invention.
Figure 16:
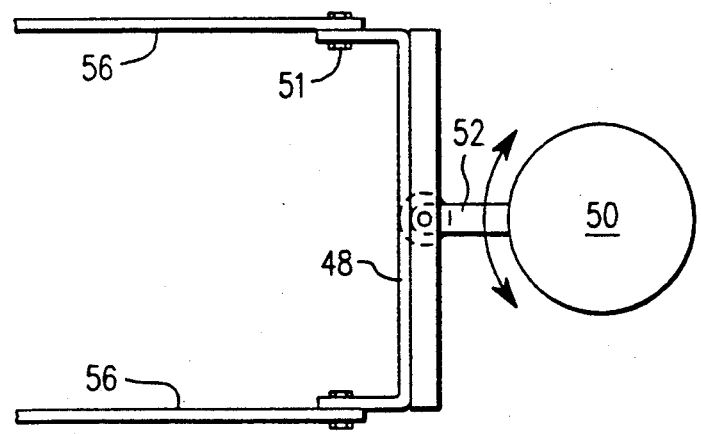
FIG. 16 is a top view of the apparatus of FIG. 15.

Shuttle bars 56 and pusher bar 196 form the dispensing mechanism in carton retainer assembly 144. Solenoid 152, when energized, causes pusher bar 196 to engage with shuttle bars 56. Movement of pusher bar 196 to engage shuttle bars 56 is controlled by motor 50, which is connected to shuttle bars 56 by crank arm 52 and bar joiner 48. The details of the cooperation between motor 50, crank arm 52, bar joiner 48 and shuttle bars 56 are shown in FIGS. 15 and 16. Position sensors 616 and 618, which are preferably Hall Effect proximity sensors manufactured by Turck under Model No. N15-G12-AN6X, monitor the position of crank arm 52 and, hence, the position of shuttle bars 56.

Base assembly 80 includes picker bar 106 which is used to dispense products stored in pack dividers 52 and 62 and motor 82 which rotates shaft 130 to control movement of sweeper bars 134 of conveyor assembly 140. Picker bar 106 includes a plurality of solenoids 108 which, when activated, engage individual packs of cigarettes from pack dividers 62. Motor 86 controls the movement of picker bar 106 which moves from side to side along shafts 102 in a direction transversely to that of shuttle bars 56.

Conveyor assembly 140 includes floors 136 and 138, sweeper bars 134 and openings 78. Products from pack dividers 62 or carton compartments 64 and 66, dispensed by the respective dispensing mechanism, will fall onto floors 136 or 138, depending on the location of the product selected and the opening 78 associated with a particular product selecting console 34. Floors 136 are movable and are controlled by motors 292. Moveable floors 136, in conjunction with non-movable floors 138, move to close off openings 78 which do not correspond to the particular associated selecting console 34. Sweeper bars 134 engage with the dispensed product resting on floors 136 and/or 138 to deliver the product to the checkout clerk by causing the product to fall through the open opening 78 of floor 282, associated with the clerk's console 34, and then down chute 30.

The raising and lowering of compartment unit 38 from ceiling 22 is controlled by motor 72, mounted in center assembly 42 by motor mount 74. Sprockets 76 engage with sprockets 118, mounted on base assembly frame 234. Drums 110 and 116 are rotated by shafts 120, 126 and 128. Cables 40 are connected directly to ceiling 22 and drums 116. Cables 41 are connected to ceiling 22, pass through pulleys 88 and are attached to drums 110. This arrangement allows compartment unit 38 to be raised and lowered easily and efficiently.

Figure 6:
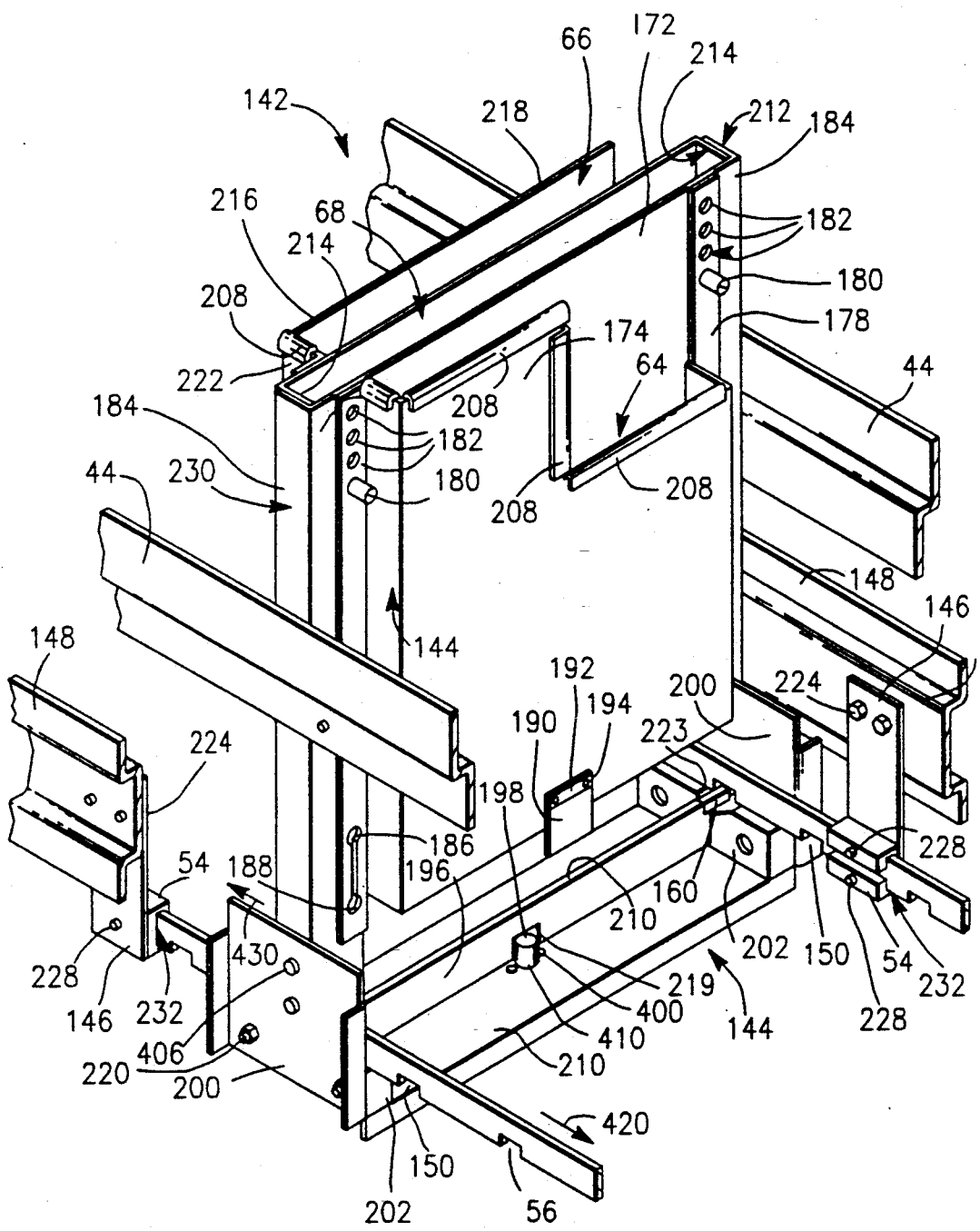
FIG. 6 is a perspective view of a carton dispenser.

FIGS. 5 through 11 show various sections of dispenser 20. Carton compartment assembly 142 includes front panels 174 and 218, back panels 172 and 216 and fasteners 180 and 188. Back panels 172 and 216 are bent to form flanges 184 and 214, respectively. Flanges 184 and 214 also are sized and shaped so as to permit the outer faces of flanges 214 to abut against the inner faces of flanges 184, forming back assembly 212 and back assembly cavity 68 (FIG. 6). Cavity 68 may be of any size and shape provided that the width and length of cavity 68 are sized and shaped as to permit pusher bar 196, when ejector 198 extends into notch 219, to move vertically between the stacks of products placed within openings 64 and 66.

Opening 64 is formed in front panel 174. Front panel 174, also, is bent to form side walls 176 and flanges 178. The size and shape of walls 176 may be varied in accordance with the various sizes and shapes of products to be positioned within opening 64. Flanges 178 further define holes 182 and slots 186. Holes 182 and slots 186 permit the raising and lowering of panel 174 along flange 184 of back panel 172, which aids in accommodating products of various sizes within opening 64. Fasteners 180 and 188 attach panel 174 to flange 184 through holes 182 and slots 186, respectively.

Extremities 208 of panel 174 are bent toward the interior of opening 64 to present a smooth edge to the person loading products into opening 64. When products are introduced into opening 64, the bottom product rests on platform 210 of the carton retainer assembly. Strap 190, attached to the face of panel 174 by retainer 192 and fastener 194, engages the top portion of the bottom product and permits proper discharge of the product. Opening 66 is similarly formed from front panel 218 which is bent to form side walls 222 and flanges 230. Fasteners, 180 and 188 attach front panel 218 to back panel 216, forming opening 66.

Carton retainer assembly 144 includes platform 210 and side walls 200. Platform 210 provides a base for a vertical stack of cartons to rest on when they are loaded through openings 64 and 66 of carton compartment assembly 142. Sidewalls 200 of platform 210 are attached to flanges 184 by fasteners 406. Solenoid 152 is mounted to the bottom of platform 210 by fasteners 400. Ejector 198 extends through opening 410 of platform 210 such that when pusher bar 196 rests on platform 210, ejector 198 partially extends into notch 219 of bar 196. Flanges 160, which extend out from either end of bar 196 and rest in sloped notches 223 of bar supports 202, are sized and shaped so as to removably engage the edges of notches 150 of shuttle bars 56.

When solenoid 152 is energized, ejector 198 rises from its passive lowered position to its active raised position, engaging with the top of notch 219 of pusher bar 196. The engagement of ejector 198 in notch 219 is such that it causes pusher bar 196 to move vertically until flanges 160 of pusher bar 196 engage with notches 150 of shuttle bars 56. The engagement of flanges 160 of pusher bar 196 in notches 150 of shuttle bars 56 is such that when crank arm 52, whose movement is controlled by motor 50, turns, (FIGS. 15 and 16) shuttle bars 56 and pusher bar 196 will move as a combined unit. Crank arm 52 will turn in either a clockwise direction or a counterclockwise direction depending on the location of the product in dispenser 20. Clockwise movement of crank arm 52 will cause the mutually engaged shuttle bars 56 and pusher bar 196 to move in the direction of arrow 430 while counterclockwise movement of crank arm 52 will cause the mutually engaged shuttle bars 56 and pusher bar 196 unit to move in the direction of arrow 420 (FIG. 6).

Horizontal movement of shuttle bars 56 by crank arm 52 is maintained by guide blocks 54. Shuttle bars 56 rest in slots 232 of guide blocks 54 which are mounted to supports 146 by fasteners 228. Supports 146 are further mounted on rails 148 by fasteners 224. When the mutually engaged shuttle bars 56 and pusher 196 unit moves in direction 420 the bottom carton in carton compartment 64 will be dispensed. Similarly, when the unit moves in direction 430 the bottom carton in carton compartment 66 will be dispensed. The dispensed products fall onto floors 136 or 138 depending on the product location.

Figure 7:
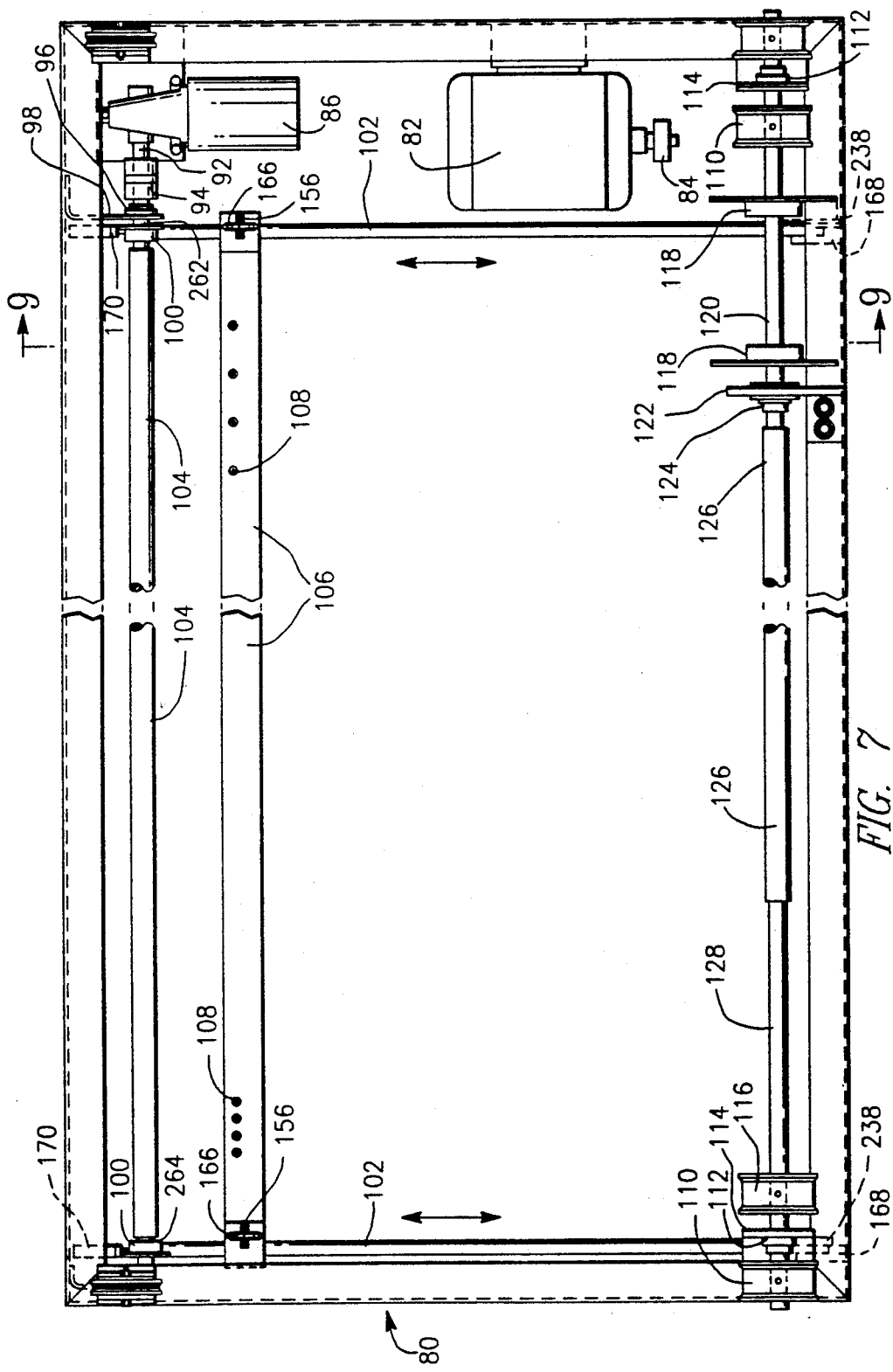
FIG. 7 is a top view of the base assembly of the product dispenser.
Figure 8:
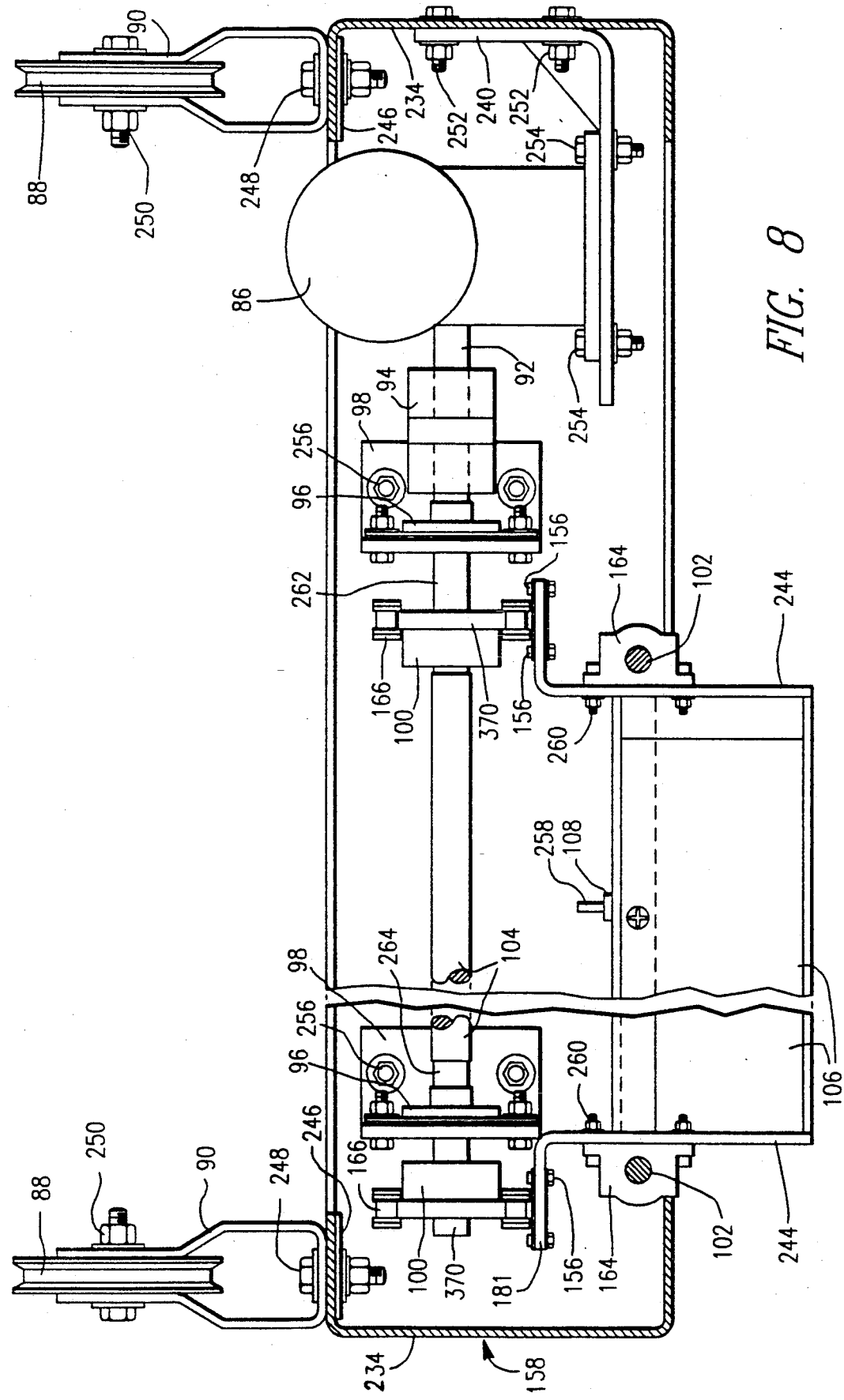
FIG. 8 is a front elevational view of a portion of the base assembly of FIG. 7.
Figure 9:
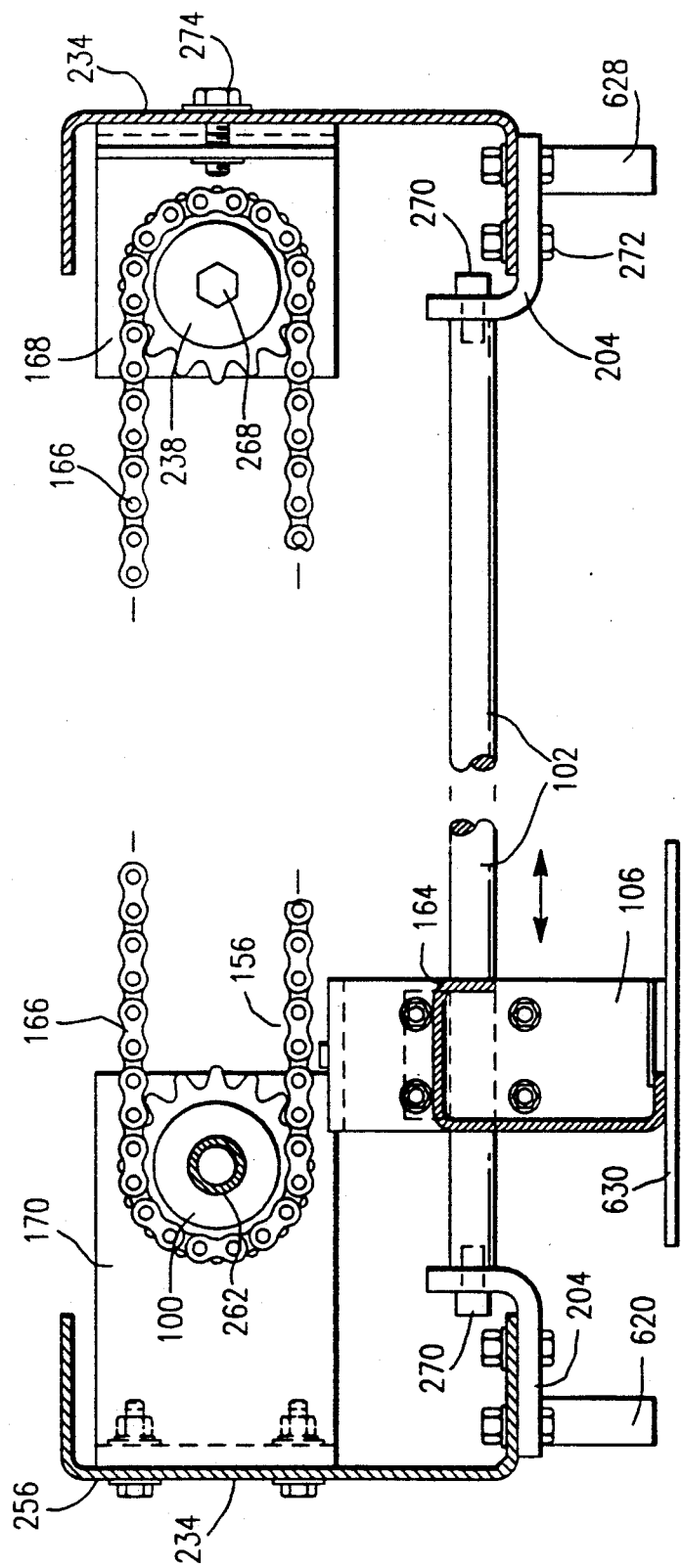
FIG. 9 is a side elevational view of the base assembly of FIG. 7 showing a detail of the chain and sprockets.

Connected to center assembly 42 is base assembly 80 which is shown in various sections in FIGS. 7 through 9. Picker bar 106 traverses base assembly 80 along shafts 102, as shown by the directional arrows, depending on the location of the selected product (FIG. 7). Shaft 104 assures synchronous rotation of sprockets 100 on shafts 262 and 264. Secure mounting of bearings 96 to frame 234 by brackets 98 and fasteners 256 prevents lateral movement of shaft 104. Sprockets 238 are placed on a side opposite sprockets 100. Fasteners 156 attach flanges 181 of bar 106 to chains 166, which engage and rotate on sprockets 100 and 238. Sprockets 238 rotate on shaft 268 and are mounted on tension brackets 168, fastened to frame 234 by fasteners 274, to ensure proper movement of bar 106 on shafts 102. Bearings 164 facilitate this movement and are mounted to flange 181 by fasteners 260 to ensure linear movement of bar 106 on shafts 102. Securing shafts 102 to frame 234 by using brackets 204 and fasteners 270 and 272 ensures no lateral movement of shafts 102.

Fasteners 256 securely fasten brackets 98 to base frame 234 to ensure proper alignment of shafts 262, 104 and 264. Brackets 90 are fastened to frame 234 by plate 246 and fastener 248 to prevent movement of brackets 90. Such movement could result in the uneven extension of dispenser 20 from ceiling 22 when loading, unloading or inspection is required. Pulleys 88 are mounted on brackets 90 by fasteners 250 to allow free rotation of pulleys 88 when dispenser 20 is raised or lowered. Motor mount 240, attached to motor 86 and frame 234 by fasteners 254 and 252, respectively, prevents lateral movement of motor 86.

Figure 10:
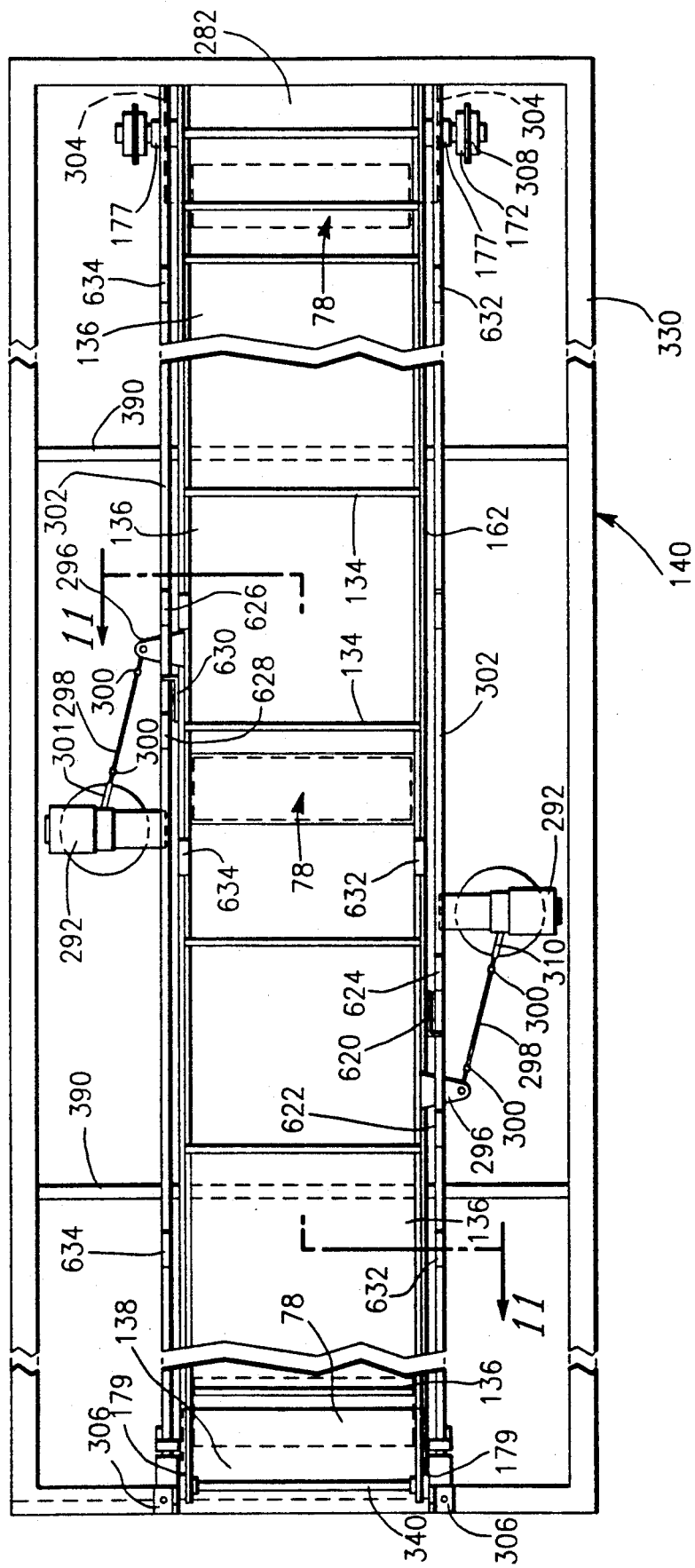
FIG. 10 is a top view of the conveyor assembly of the product dispenser.
Figure 11:
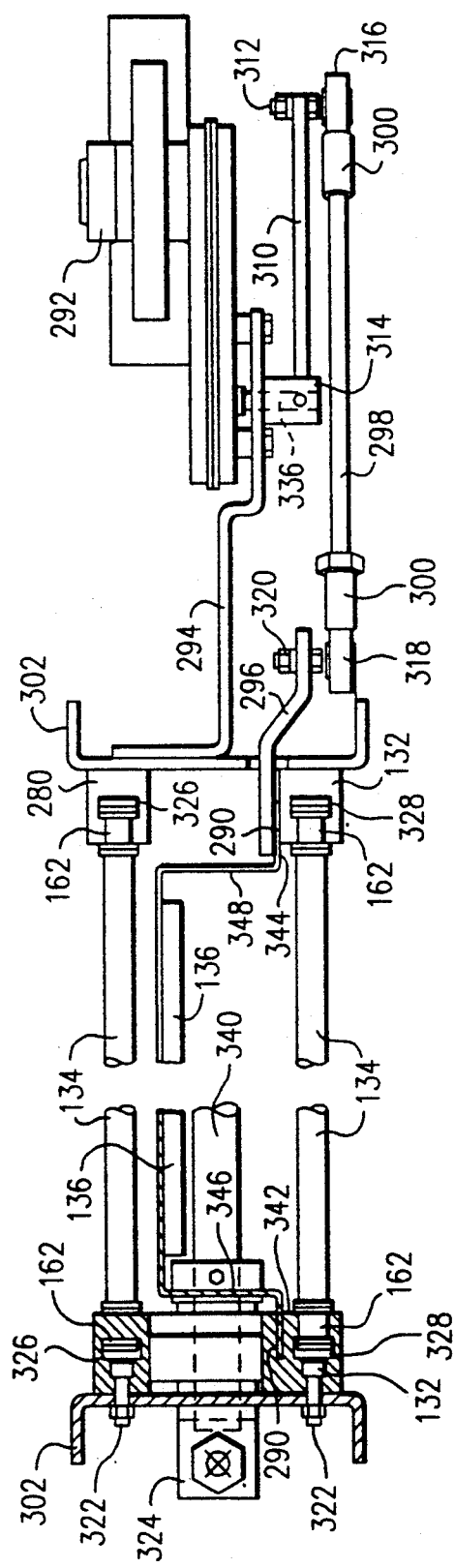
FIG. 11 is side elevational view of the conveyor assembly.

FIGS. 10 and 11 show conveyor assembly 140. After a product is dispensed, by either picker bar 106 or pusher bar 196, it will fall onto either floors 136 or 138 depending on the product storage location. When a product is selected, motors 292 cause floors 136, which move independently of one another, to slide along slots 290 of lower chain supports 132. Floors 136 move to close off openings 78 which do not correspond to the console 34 where product selection was made. As shown in FIG. 10, floors 136 are moved to close openings 78 on either end of dispenser 20 and open opening 78 in the center of dispenser 20.

Attached to each door 136 is a ferrous angle 620. Positioned on either side of angle 620 are sensors 622 and 624. Each of sensors 622 and 624 are preferably Hall Effect proximity sensors which are activated and send a signal to controller 608 (FIG. 14) when angle 620 is in close proximity to the sensor. Therefore, by monitoring which of sensors 622 and 624 is activated, the position of door 136 may be determined. Similarly, sensors 626 and 628 detect the position of ferrous metal plate 630 which is representative of the position of picker bar 106.

When the selected product is resting on floors 136 or 138, sweeper bars 134, driven by chains 162, move the selected product to the open opening 78. Sweeper bars 134 are sized and shaped to engage with any sized product that may be dispensed onto floors 136 or 138. Chains 162, guided by slots 326 of upper chain guide 280 and slots 328 of lower chain guide 132, are driven by sprockets 177 which rotate on shafts 130 and 340. Shaft 130 is driven by motor 82 of base assembly 80. Cable 175 connects pulley 84 of motor 82 to sprocket 173 on shaft 130. Shaft 340 rotates on bearings 179 and maintains synchronous movement of chains 162 along slots 326 and 328 of chain guide 280 and 132, respectively.

Emitter 632 and receiver 634 form an optical sensing system. Emitter 632 transmits a beam of light just above the surface of door 136 and perpendicular to the direction of travel of the product along floor 136. Receiver 634 is positioned to receive the beam of light from emitter 632. However, when a product is traveling along floor 136 the product momentarily blocks the light beam to receiver 634. When that occurs, receiver 634 sends a signal to controller 608 indicating that the product is moving through the dispenser.

As shown in FIG. 10, two emitter 632/receiver 634 optical sensing systems are positioned in close proximity to each opening 78. When a product falls through a particular opening 78, it will, necessarily, break the beam of light of one of the two optical sensing systems associated with that opening. Therefore, controller 608 determines whether a product has been discharged through a particular opening 78 by monitoring the position of the associated floor 136 and whether one of the beams of light from one of the two associated optical sensing systems has been broken.

Parallel placement of drive rods 310 with respect to rods 298 is maintained when motors 292 are mounted to supports 294 which are connected to frames 302. Shaft coupling 314 translates rotational movement of shaft 336 to lateral movement on rod 310. Lateral movement of rod 310 is transferred to rod 298 by fastener 312, joint 316 and connector 300. Movement is finally transferred to flange 344, formed by flange 348, of floor 136 by plate 296, connected to rod 298 by connector 300, joint 318 and fastener 320, causing floors 136 to move.

To prevent floors 136 from bowing and binding in slots 290, supports 390 are transversely placed in conveyor assembly 140. Supports 390 may be placed above or below movable floors 136 depending on the length of dispenser 20. The number of movable floors 136 can also vary depending on the length of dispenser 20 and the number of openings 78 required to fit the needs of the merchant using the dispenser 20.

When restocking dispenser 20 is needed or maintenance is required, compartment unit 38 can be raised or lowered in or out of the shell of dispenser 20 on cables 40 and 41. Motor 72 engages sprockets 118, which are connected to shaft 120, through gear reducer 170 attached to motor 72, and sprockets 76 mounted on reducer 170. Shaft 120 rests on bearings 124 which are attached to base assembly frame 234. Shaft 128, connected to shaft 120 by shaft 126, and shaft 120 ensure synchronous rotation of drums 110 and 116 so that compartment unit 38 can be raised or lowered vertically out of dispenser 20 by motor 72 without tilting. Shafts 120 and 128 rest on bearings 112 attached to base assembly frame 234 by brackets 114 to ensure smooth rotation when unit 38 is raised or lowered.

Cables 40 and 41 are secured to ceiling 22 and are attached to drums 116 and 110, respectively, such that cables 40 and 41 are perpendicular to the longitudinal axis of base 80 and cables 41 are parallel to one another. Cables 40 are directly attached to ceiling 22 and drums 116. Cables 41 are also directly attached to ceiling 22 but drop from ceiling 22 vertically and pass around pulleys 88, which are secured to base assembly frame 234 by brackets 90. Pulleys 88 are secured to brackets 90 by fasteners 250. Brackets 90 are further secured to frame 234 by plate 246 and fasteners 248. After passing through pulleys 88, cables 41 travel along the top of center assembly base 158, in a direction parallel to shafts 102, and are finally secured to drums 110.

When it is desired to lower unit 38, motor 72 causes sprockets 76 and sprockets 118 to rotate. Shafts 120 and 128 are rotated by the action of sprockets 118. Cables 40 and 41 uncoil from drums 116 and 110, respectively, causing unit 38 to be lowered from ceiling 22. Restocking or maintenance of unit 38 can then be performed. When restocking or maintenance is complete, unit 38 can be raised into dispenser 20 in a manner similar to lowering unit 38, except cables 40 and 41 are taken up on drums 116 and 110.

Figure 12:
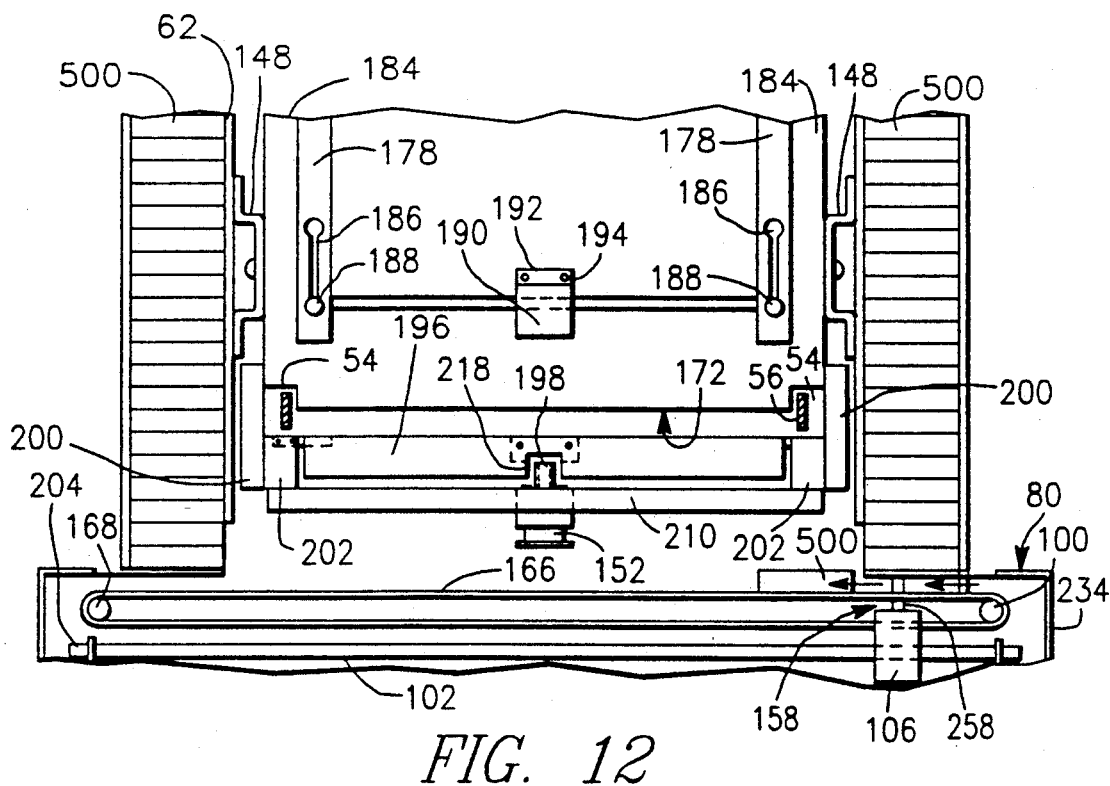
FIG. 12 is a front elevational view of the interior of the product dispenser showing a detail of a pack being dispensed.

FIG. 12 shows a detail of an individual pack 500 of cigarettes being dispensed from the dispenser. As shown by solid lines, solenoid 108 is positioned behind a single pack 500 of cigarettes while ejecting member 258 is raised behind pack 500. As shown by the dashed lines, chain 166 moves solenoid 108 causing ejecting member 258 to engage pack 500 and discharge it from pack divider 62.

Figure 13:
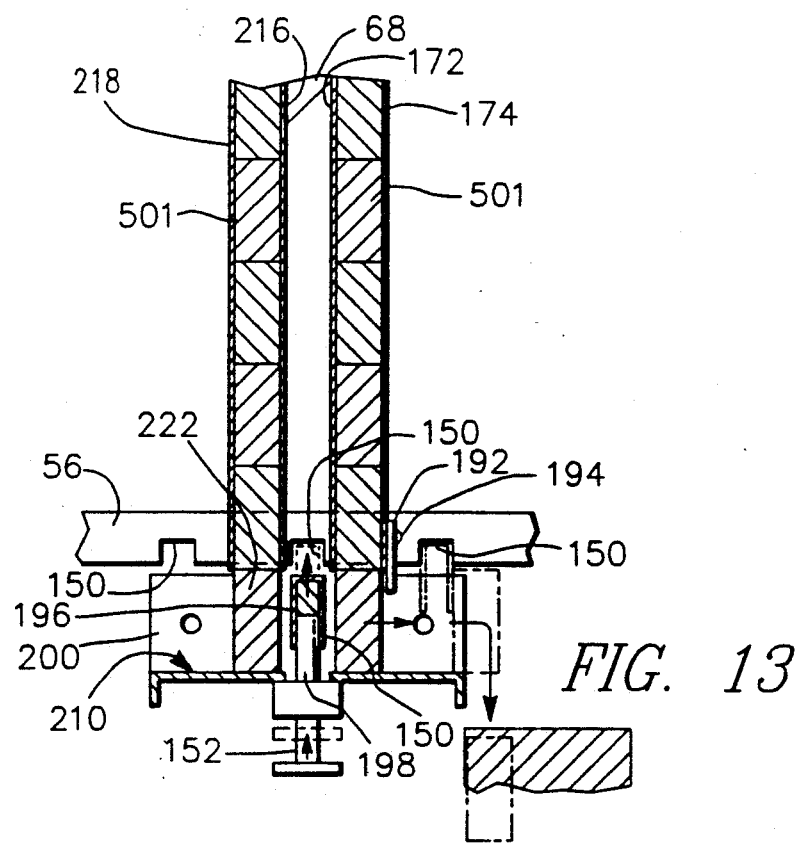
FIG. 13 is a side elevational view of the interior of the product dispenser showing a detail of a carton being dispensed.

FIG. 13 shows a detail of the carton dispenser of the dispensing apparatus. A plurality of cartons 501 are stored within carton compartments 64 and 66. As shown by solid lines, ejector 198 and bar 196 are in their lower position and not in engagement with the edges of the notch in shuttle bar 56. As shown by dashed lines, when ejector 198 is raised to engage the edges of notch 219 of shuttle bar 56, and shuttle bar 56 is then moved to the right, bar 196 engages with a single carton 501 causing it to be ejected onto floor 282.

Figure 14:
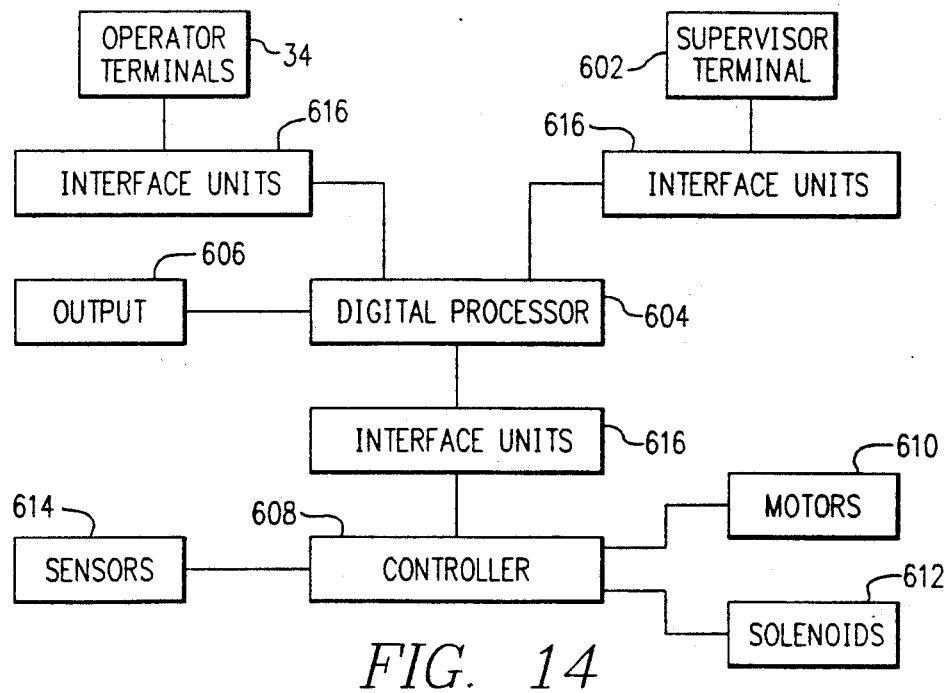
FIG. 14 is a block diagram of the control system of the present invention.

FIG. 14 shows a block diagram of the control circuits of the product dispenser. Digital processor 604, which is preferably a Rockwell RM65-1000E computer, controls the operation of the product dispenser. Digital processor 604 employs a memory unit preferably manufactured by Rockwell under Model No. RM65-3264NE. Also connected to digital processor 604 are, preferably, two Rockwell RM65-5451E interface units 616. These interface units are interposed between operator terminals 34 and digital processor 604 and between controller 608 and digital processor 604. Controller 608 is preferably manufactured by RBB Systems, of Shreve, Ohio, as a Micro 1 controller. Additionally, interface 616 is interposed between digital processor 604 and supervisor terminal 602. Supervisor terminal 602 is preferably a Texas Instrument Model 703 Port Printing Terminal which is used to enter product inventory information into the memory of digital processor 604 and to receive data from digital processor 604 and present it in a written report format. The physical interconnection between these electrical components are well known to those of ordinary skill in the art.

Controller 608, in turn, receives information from sensors 614. Sensors 614 comprise the various Hall Effect magnetic proximity sensors and optical sensors which have been previously described. Data received by controller 608 from sensors 614 is transmitted to digital processor 604 for analysis. Digital processor 604 then provides control signals to controller 608 which, in turn, operates motors 610 and solenoids 612. Motors 610 comprise the various motors which operate the pack picker motor 86, hoist motor 72, conveyor motor 82 and motor 50. Solenoids 612 comprise solenoids 108, which knock out individual packs of cigarettes and solenoids 152 which lift bar 196.

The checkout clerk specifies the desired product by selecting a product button or product code on console 34. This date is transmitted, through interface 616 to digital processor 604. Digital processor 604 then provides control signals to controller 608, through interface 616, which, in turn, operates motors 610 and solenoids 612, thereby delivering the product to the desired location. Digital processor 604 also maintains inventory records regarding the location and quantity of stored products so that the proper compartment can be accessed for product dispensing. Additionally, supervisor terminal 602 also includes a printer to provide store personnel with inventory data as needed.

If a large product, for example, a carton of cigarettes, is specified, solenoid 152 is energized, causing ejector 198 to engage with notch 219 of pusher bar 196, causing flange 160 of bar 196 to engage notch 150 of shuttle bar 56. Bar 196 is raised by ejector 198 to ensure proper ejectment of the desired product. When the clerk enters the selected product code, shuttle bar 56, moved by crank arm 52, causes engaged pusher bar 196 to eject the carton onto floors 136 or 138. At the same time a product is being selected, floors 136 are moved by motors 292 to close off all but the individual opening 78 which corresponds to the location of console 34 where product selection was initiated.

Simultaneously, motor 82 causes sweeper bars 134, attached to chain 162, to travel in a direction toward opening 78 corresponding to selecting console 34. When the product code is selected and entered, the product is ejected by pusher bar 106 onto floor 136 or 138. Sweeper bars 134 guide the product to proper opening 78. Chute 30, connected to opening 78 by flange 206, receives the ejected product and guides it to the checkout clerk stationed at checkout counter 32 corresponding to selecting console 34.

If a small product, for example a pack of cigarettes, is specified, picker bar 106 will move along shafts 102 to either side of dispenser 20, depending on the location of the desired product. Ejecting member 258 of solenoid 108 then rises from its passive position to its ejecting position behind the end of the pack to be dispensed. Picker bar 106 then reverses direction causing ejecting member 258 to push the desired product from compartment 52 or 62 onto floors 136 or 138, guided by sloped walls 234 of base assembly 80. The product is then guided to the checkout clerk selecting the product in the manner described above.

It may be appreciated, therefore, that the present invention provides improved apparatus for the secure storage and easy distribution of items, and associated control apparatus, and is particularly suitable for the storage and distribution of cigarette packs and cartons. The apparatus of the present invention also provides an accurate system for keeping an inventory of stored and distributed items and provides a convenient mounting arrangement which does not require the use of valuable floor space.

Whereas particular embodiments of the invention have been described for purposes of illustration, it will be evident to those skilled in the art that numerous variations of the details may be made without departing from the invention as defined in the appended claims.

We claim:

1. An overhead product dispenser comprising:
   at least one storage compartment that is capable of receiving and storing a plurality of products, and of being lowered from an overhead position to permit the loading of products into said compartment;
   an ejector that is selectively actuable to eject a product from said storage compartment onto a surface that defines at least two delivery ports;
   said surface defining a movable floor for each said delivery port that is selectively actuable to open and close said delivery port to control delivery of the products through said delivery ports to at least two locations; and
   a sweeper that pushes an ejected product along said surface to an opened said delivery port for delivery to a preselected location.

2. The dispenser of claim 1 including a plurality of said delivery ports and said movable floors.

3. The dispenser of claim 2 including slide means for moving said ejector relative to said storage compartment.

4. The dispenser of claim 3 including solenoid means for engaging said ejector with said slide means.

5. The dispenser of claim 2 including a plurality of said ejectors for disengaging products from said storage compartment.

6. The dispenser of claim 5 including said ejectors being operated by solenoid means.

7. The dispenser of claim 6 including chain means for moving said ejectors relative to said storage compartment.

8. The dispenser of claim 1 including control means for controlling the operation of said dispenser.

9. The dispenser of claim 8 including said control means having means for selecting a product to be dispensed.

10. The dispenser of claim 9 including said control means including digital processor means.

11. The dispenser of claim 10 including said control means having reporting means for providing data representative of the operation of said dispenser.

12. The dispenser of claim 11 wherein said data include the quantity and identity of products dispensed from said dispenser.

13. The dispenser of claim 12 wherein said data includes the quantity and identity of products positioned within said dispenser.

14. The dispenser recited by claim 1 wherein said storage compartment includes product holders from which the products are dispensed, said product holders being adjustable to accommodate products of different sizes.

* * * * *